June 12, 1962  M. A. YAKUBIK  3,038,828
DECORATIVE PLASTIC FLOOR COVERING OR THE
LIKE AND METHOD OF MAKING THE SAME
Filed March 31, 1958  2 Sheets-Sheet 1

INVENTOR.
MICHAEL A. YAKUBIK
BY
*P. L. Miller*
ATTORNEY

June 12, 1962 M. A. YAKUBIK 3,038,828
DECORATIVE PLASTIC FLOOR COVERING OR THE
LIKE AND METHOD OF MAKING THE SAME
Filed March 31, 1958 2 Sheets-Sheet 2
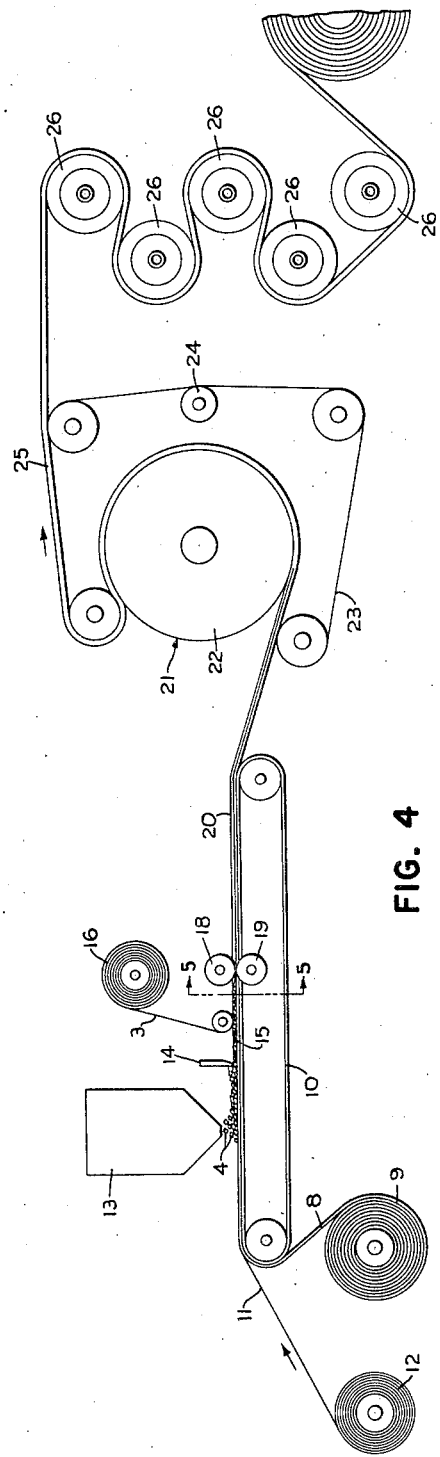
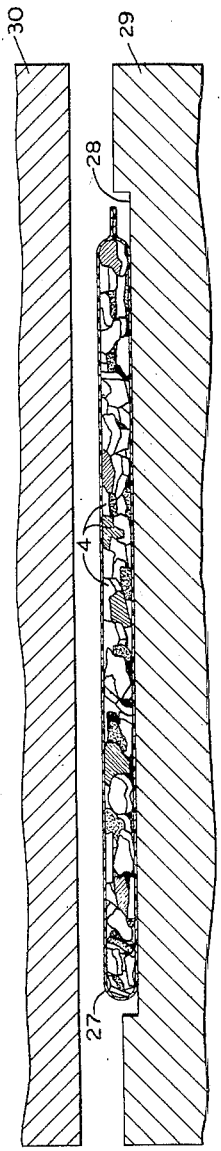
INVENTOR.
MICHAEL A. YAKUBIK
BY
*R. L. Miller*
ATTORNEY United States Patent Office 3,038,828
Patented June 12, 1962

3,038,828
DECORATIVE PLASTIC FLOOR COVERING OR THE LIKE AND METHOD OF MAKING THE SAME
Michael A. Yakubik, Hudson, Ohio, assignor to The Goodyear Tire & Rubber Company, Akron, Ohio, a corporation of Ohio
Filed Mar. 31, 1958, Ser. No. 725,274
11 Claims. (Cl. 154—49)

This invention relates to decorative floor or wall coverings or the like and a method of making the same and more particularly to such coverings made of granules or particles having a unique surface appearance.

It is an object of the invention to provide a decorative floor or wall covering and method of making such coverings of granules or particles of thermo-flowable plastic material in which the identity of each granule or particle is retained at the surface of the finished sheet and the interstices between the granules or particles are filled with transparent plastic material having different surface light reflecting properties than the surface of said granules or particles.

A further object of the invention is to provide a sheeting material of the character described and a method of making the same in which a thin sheet or film of transparent plastic material is provided at the surface of the sheet and is inlaid between the granules or particles to provide a unique decorative surface appearance.

The above and other objects and advantages of the present invention will become more apparent from the following description of the drawings in which:

FIG. 4 is a schematic view of an apparatus for performing the method for making the sheet of this invention;

FIG. 5 is a cross-sectional view taken along the lines 5—5 of FIG. 4;

FIG. 6 is a cross-sectional view showing another form of the method of making the decorative sheet shown in FIG. 1.

Figure 1:
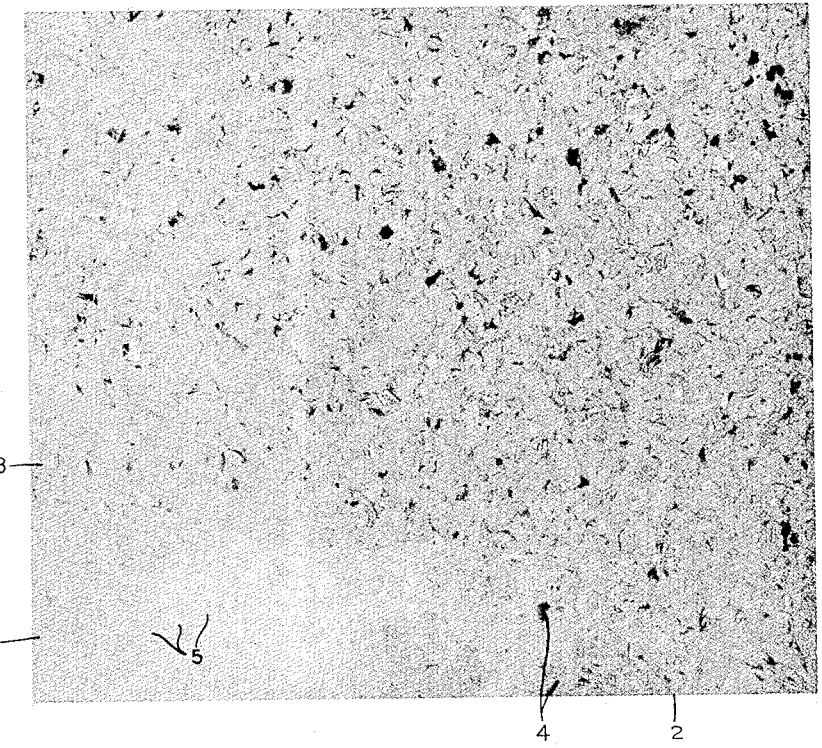
FIG. 1 is a plan view of the finished decorative sheet of the present invention.
Figure 2:
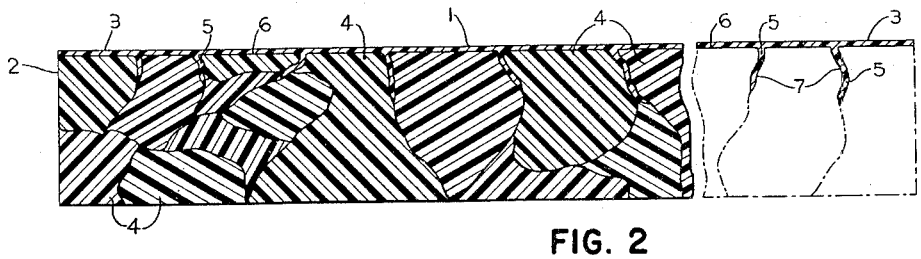
FIG. 2 is an enlarged cross-sectional view through the sheet shown in FIG. 1.

Referring to FIGS. 1 and 2 of the drawings, the wearing surface 1 of the finished floor or wall covering or sheet 2 is formed by a transparent ply or film 3 through which pigmented particles or granules 4 appear in sharp outline similar to that obtained in terrazzo flooring. The surface of the sheet is covered with a transparent film 3 which is inlaid into the interstices or spaces 5 between the granules or particles 4 for a substantial distance from the surface of the sheet so that the thickness of the transparent film is substantially uniform at the exposed surface 6 of each particle but varies in thickness within the interstices 5 at the edges 7 of the particles. The surfaces 6 of the particles are plane surfaces substantially parallel to each other and to the wear surface 1. The transparent film 3 provides a hard wearing surface 1 for the sheet 2 and may be processed so as to provide any degree of gloss. The light reflecting properties of the surface 1 of the sheet 2 are substantially uniform at the exposed surface 6 of each of the particles but, since the thickness of the film inlaid between the particles 3 varies and the interstices 5 formed between the particles 3 varies in width, light will be diffused along the edges 7 of each particle whereby rays of light striking the surface 6 of the particle will be reflected to produce a cloisonné effect. That is, the periphery of edge 7 of each particle 3 is outlined with clear plastic material having light diffusing properties while at the same time the surface 6 of each particle has light reflecting properties. The surface 1 of the covering material 2 is perfectly smooth and provides a surface highly resistant to wear and easy to clean.

Figure 3:
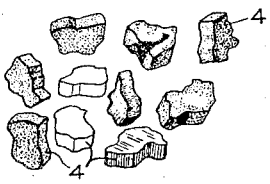
FIG. 3 is a 3-dimensional view of the granules or particles incorporated into the decorative sheet shown in FIG. 1.

The floor or wall covering 2 shown in FIG. 1 is formed by arranging granules or particles 4 of thermo-flowable plastic material in a layer, applying a sheet of transparent film 3 over at least one side of said layer and subjecting the layer and film to heat and pressure sufficient to cause the transparent film 3 to flow into the spaces or interstices 5 between the granules or particles 4 and to fuse the particles 4 and film 3 into a solid sheet. As shown in FIG. 3, the particles or granules 4 may be of irregular or uniform geometric shape and of varying size but in general the particles should have at least one dimension not substantially greater than the thickness of the finished sheet.

As indicated above, the granules and particles 4 as well as the film 3 comprise thermo-flowable plastic material which may be thermo-plastic or thermo-setting after the application of heat. If thermo-setting plastic material is used, the granules and film are compounded so that polymerization is not completed prior to assembly of the granules and film to form the sheet of this invention. Examples of plastic materials which are adapted for use in this invention are: vinyl chloride, vinyl acetate, styrene, polyethylene, acrylonitrile, acrylic or methyl acrylic esters or polymerization products of the mixtures of the aforementioned compounds with each other or with other polymerizable compounds. The process of this invention is of particular significance in the manufacture and treatment of polymerization products of vinyl chloride including vinyl chloride alone or copolymers of vinyl chloride and other polymerizable substances. It will be clearly understood that the addition of certain softening agents, plasticizers, pigments, dye stuffs, stabilizing agents may be made to the plastic materials. A satisfactory vinyl resin composition for the granules or particles is given below:

| | Parts by weight |
|---|---|
| Vinyl chloride resin | 25.00 |
| Plasticizer | 11.00 |
| Stabilizer | 1.50 |
| Filler | 62.00 |
| Color | .50 |
| | 100.00 |

A satisfactory vinyl resin composition for the transparent film is as follows but tints or dyes may be added to provide a colored transparent film:

| | Parts by weight |
|---|---|
| Stabilizer | 0.80 |
| Vinyl chloride resin | 79.00 |
| Plasticizer | 20.00 |
| Tinting material | 0.20 |
| | 100.00 |

It will be understood that modifications of these formulae are possible and will be readily evident to those skilled in the art. Furthermore, it is evident that the granules or particles may be of any color or colors and in general the particles are formed by calendering sheets of 5 to 15 mils of solid color, marbelized or mottled plastic material and thereafter cutting or chopping the calendered sheet into granules or particles of small, irregular configurations which may vary widely in size so long as at least one dimension thereof is not substantially greater than the thickness of the plastic sheet 2 of this invention which has an overall thickness of from 6 to 15 mils.

Referring to FIGS. 4 and 5 of the drawings, an apparatus is shown for continuously making the decorative sheet material 2 of this invention and particularly floor covering material. A web of opaque backing material 8 is fed from the roll 9 onto the conveyor belt 10 and a sheet of transparent film 11 is fed from the roll 12 onto the opaque sheet 8. Granules or particles 4 are fed from the hopper 13 onto the surface of the film 11 and a doctor blade 14 may be used to form a layer 15 of particles or granules 4 of substantially uniform thickness. The layer 15 of particles 4 is then covered with a transparent film 3 fed from the roll 16. The width of the film 3 and 11 extends beyond the edges 17 of the conveyor 10 in overlapping relation as shown in FIG. 5 and a pair of heated sealing rolls 18 and 19 are provided at each edge of the conveyor 10 to seal both edges of the film 3 and 11 to thereby enclose the particles or granules 4 and form a containing tube 20. The tube 20 is then fed into a continuous molding apparatus 21 of conventional form comprising a heated drum 22 and a pressure belt 23. The tubular assembly 20 is fed between the drum 22 and pressure belt 23 for a substantial portion of the circumference of the drum 22 and the belt 23 is tensioned by the tension roller 24 to apply pressure on the assembly 20. After passing around the drum 22 the finished flooring assembly 25 is passed around a plurality of cooling rolls 26 which cool the flooring material to room temperature.

During passage between the surface of the drum 22 and the belt 23 the film 3 of the assembly 20 initially contacts the heated drum 21 and is melted or heated sufficiently to flow between the particles 4 before the particles or granules are heated to any substantial degree and fused into a solid mass.

FIG. 6 illustrates a modification of the non-continuous method of making the floor or wall covering 2 of the present invention. The particles 4 are placed within a bag or container 27 which is substantially flat and conforms generally to the configuration of the mold cavity 28 of mold 29. In this modification individual tiles of floor or wall covering are made in mold 28 by placing the bag 27 containing a predetermined volume or weight of particles 4 into the cavity 28 and closing the platen mold cover 30 so as to apply sufficient heat and pressure to the bag 27 and the particles therein to cause the bag to melt and flow into the interstices between the particles 4 and to fuse the particles 4 into an integral mass. The platen 30 and mold 29 are heated by any suitable means such as steam coils, electric-resistant or dielectric heating means or the like.

Although the processes described with reference to FIGS. 4 and 5 and FIG. 6 have been described and illustrated so that the particles 4 are completely retained within a transparent film bag, tube or container, it is to be understood that the continuous process illustrated in FIGS. 4 and 5 may be carried out by using a single ply of transparent film which forms the wearing surface 1 of the finished product. Likewise, instead of containing the granules 4 in a bag 27, as shown in FIG. 6, a predetermined quantity or weight of particles may be deposited in the mold cavity 28 and a sheet of transparent film placed thereover prior to closing of the mold cover 30.

As indicated above, the floor and wall covering material has been described with reference to vinyl chloride plastic materials. When using such materials in this invention, pressure of approximately 1500 p.s.i. and a temperature of 340° to 360° F. are applied to the drum 22, shown in FIG. 4, or mold 29 shown in FIG. 6. It is to be understood, however, that the above pressures and temperatures may be varied depending upon the flow characteristics of the particular thermo-flowable material which is used. Also, for any given thermo-flowable plastic, the temperature may be varied inversely with respect to the pressure used. For example, if a lower temperature is used a higher pressure should be employed.

When making the floor or wall covering material of this invention, air within the layer of particles or granules must be permitted to escape prior to the application of final heat and pressure. Therefore, the film 3 is preferably provided with a plurality of minute perforations, as shown in U.S. Patent 2,850,423 so that air within the layer of particles may escape through the film before the application of heat and pressure is completed.

The present invention achieves a result which is indeed unique. The finished floor or wall covering of this invention has a smooth, glossy, highly abrasion-resistant, transparent surface through which the granules or particles 4 appear. The particles retain substantially their original shape at the surface 6 which is light reflecting, whereas, the interstices between the particles diffuse light, so that the covering material or sheet 2 provides an appealing "cloisonné" appearance. The transparent film 3 melts or softens prior to or sooner than the particles 4 since the film 3 initially acts as an insulator between the heat source and the surface 6 of the particles. The melted or softened film flows into the crevices or spaces 5 adjacent the surfaces 6 of the particles before the particles melt and permits the particles to orient themselves under the applied pressure without smearing or destroying the contour of the surface area 6. The continued application of heat and pressure then fuses the particles and film into a solid mass.

While certain representative embodiments and details have been shown for the purpose of illustrating the invention, it will be apparent to those skilled in this art that various changes and modifications may be made therein without departing from the spirit or scope of the invention.

I claim:

1. A method of making a decorative floor or wall covering or the like which comprises placing a quantity of granules made of thermoplastic material in a layer of uniform thickness positioning a thin transparent sheet of thermo-flowable plastic in contact with at least one side of said layer, said sheet being thinner than said layer and subjecting the granule layer and transparent sheet to heat and pressure sufficient to cause the transparent sheet to flow into the interstices between the granules, to fuse the granules together into a solid mass, and to fuse the mass to said sheet.

2. A method of making floor or wall covering as claimed in claim 1 in which the heat and pressure are applied to said sheet and granules within a heated mold.

3. A method as claimed in claim 2 in which the granules are placed in the mold and said sheet is laid over the granules before closing the mold.

4. A method of making floor or wall covering as claimed in claim 1 in which said sheet comprises a continuous film and said particles are continuously laid on said film.

5. A method of making a decorative floor or wall covering which comprises continuously forming a tube of transparent film made of thermo-flowable material, continuously placing a predetermined quantity of thermo-flowable granules therein and subjecting the filled tube to heat and pressure sufficient to cause the transparent sheet to flow into the interstices between the granules to fuse the granules together into a solid mass, and to fuse the mass to said sheet.

6. A method of making a decorative floor or wall covering which comprises placing a quantity of granules made of thermo-flowable material in a layer on a transparent film of thermo-flowable material, laying a second transparent film of thermo-flowable material on said granules, heat-sealing the edges of said films together to form a tube surrounding said granules and subjecting said filled tube to heat and pressure sufficient to cause the transparent sheet to flow into the interstices between the granules, to fuse the granules together into a solid mass, and to fuse the mass to said sheet.

7. A decorative floor or wall covering or the like comprising a smooth, wear-resistant, outer surface formed of a layer of transparent thermo-flowable plastic material, a plurality of thermoplastic granules having parallel surfaces bonded to the under side of said transparent plastic layer, the parallel surfaces of said granules being parallel to the outer surfaces of said transparent plastic layer, said granules having interstices between the individual granules, said transparent thermo-flowable plastic material being disposed within said interstices and outlining the edges of the granules whereby light is reflected from the parallel surfaces of said granules and is diffused along the edges of said granules.

8. A decorative floor or wall covering or the like comprising a layer of granules of thermo-flowable plastic material having a plane surface parallel to the wearing surface of said covering, said wearing surface comprising a transparent layer of thermo-flowable plastic material bonded to the plane surface of said granules and extending into the interstices between said granules, the transparent plastic material disposed in the interstices between said granules being of substantially greater thickness than the transparent plastic bonded to the plane surface of said granules.

9. A floor or wall covering or the like as claimed in claim 8 in which the thickness of said transparent layer bonded to said plane surfaces is uniform and the thickness of said transparent material in said interstices is of varying thickness.

10. A method of making a decorative floor or wall covering or the like comprising placing a quantity of thermoplastic granules having two parallel surfaces in a layer of uniform thickness, positioning a thin transparent sheet of thermo-flowable plastic in contact with at least one side of said layer, and subjecting the granule layer and transparent sheet to heat and pressure sufficient to cause the transparent sheet to flow into the interstices between the granules, to fuse the granules together into a solid mass, and to fuse the mass to said sheet.

11. A method as claimed in claim 10 in which said granules are placed in said layer in overlapping relationship to each other.

References Cited in the file of this patent
UNITED STATES PATENTS

| | | |
|---|---|---|
| 2,083,201 | Poppe | June 8, 1937 |
| 2,263,792 | Wood | Nov. 25, 1941 |
| 2,350,421 | Schoder et al. | June 6, 1944 |
| 2,374,940 | Kemmler et al. | May 1, 1945 |
| 2,496,911 | Green | Feb. 7, 1950 |
| 2,584,693 | Gerard | Feb. 5, 1952 |
| 2,617,750 | Le Clair et al. | Nov. 11 1952 |
| 2,761,177 | Walters | Sept. 4, 1956 |
| 2,784,763 | Shorts | Mar. 12, 1957 |
| 2,816,852 | Banks | Dec. 17, 1957 |
| 2,835,620 | Bartlett | May 20, 1958 |
| 2,983,960 | Jilge | May 16, 1961 |

FOREIGN PATENTS

| | | |
|---|---|---|
| 728,934 | Great Britain | Apr. 27, 1955 |